Dec. 6, 1938.　　　J. LICHTENSTEIN　　　2,139,194

REGULATION OF FUEL INJECTION PUMPS FOR INTERNAL COMBUSTION ENGINES

Filed Sept. 6, 1934　　　3 Sheets-Sheet 1

Inventor:
Johann Lichtenstein.
By Jesse B. Heller,
atty.

Patented Dec. 6, 1938

2,139,194

UNITED STATES PATENT OFFICE 2,139,194

REGULATION OF FUEL INJECTION PUMPS FOR INTERNAL COMBUSTION ENGINES

Johann Lichtenstein, Levallois-Perret, France, assignor to Société Générale des Carburateurs Zenith, Levallois-Perret, France Application September 6, 1934, Serial No. 742,995
In Belgium September 18, 1933

10 Claims. (Cl. 264—3)

The present invention relates to the regulation of the output of a fuel injection pump for an internal combustion engine.

In order to increase the available power of the engine, it is advantageous to vary the limit position of the pump output controlling member that corresponds to the maximum output in accordance with the speed of revolution of the engine, this limit position varying in the direction of increasing outputs when this speed decreases. Therefore, with such an arrangement, the maximum output of the pump at low speeds of revolution is higher than what it would be if this limit position of the output controlling member were fixed and were, consequently, the same at low speeds of revolution as at high speeds of revolution. The device that serves to modify the limit position of the output controlling member in the direction of increasing outputs as a function of the speed of revolution can further be adapted to quickly reduce to a very low value the output of the pump when the speed of revolution of the engine exceeds its normal maximum value, so as to prevent the engine from working at too high a speed of revolution. An arrangement of this kind was described in the Belgian Patent No. 385,493, filed January 7, 1932, by the Société Générale des Carburateurs Zenith.

The object of the present invention is to provide a device of this kind adapted to work in connection with injection pumps including an output control member connected both with an operating organ (pedal) which is actuated by the operator and the displacements of which in the direction of increasing outputs are limited by a stop and with a centrifugal governor the weights of which move away from each other under the effect of the centrifugal force against the action of an elastic system including a spring the expansion of which is limited by a stop and which is adapted to prevent the engine from exceeding the maximum permissible working speed. This elastic system may eventually include a second spring for regulating the idling.

According to the present invention an additional spring is inserted in series with the spring that determines the maximum admissible working speed and this additional spring balances the centrifugal effort of the masses over an important portion, or the whole, of the range of normal working speeds, the compression to which this additional spring is subjected when the working speed of the engine varies within the whole of said range producing a displacement of the output control member which corresponds to only a small portion of the whole stroke of this member.

Preferred embodiments of the present invention will be hereinafter described with reference to the accompanying drawings, given merely by way of example, and in which:

Fig. 1 diagrammatically shows, in elevation partly in section, a device according to the present invention;

Fig. 2 diagrammatically shows, in longitudinal section, the governor of Fig. 1;

Figure 1:
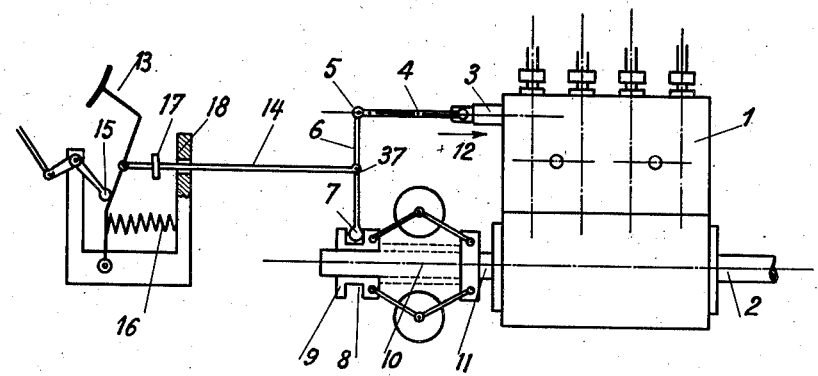
Figure 2:
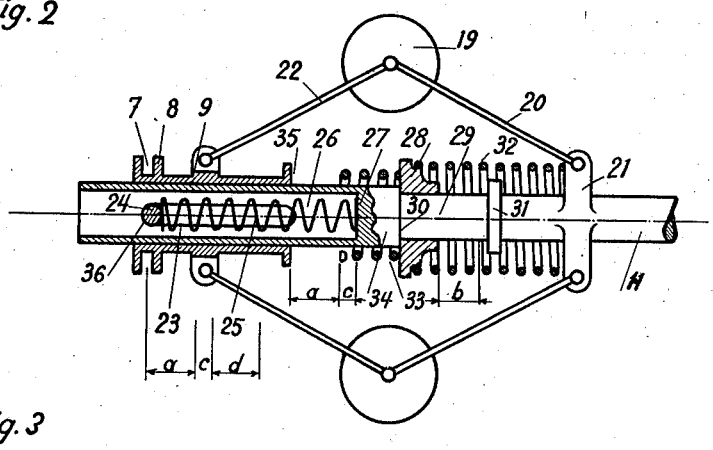

In the embodiment of Fig. 1, the pump 1 is driven by a shaft 2 itself driven by the driving shaft of the engine. The output of pump 1 is regulated by an output control member 3 connected through a rod 4 with the end 5 of a lever 6. The displacement of control member 3 in the direction of arrow 12 corresponds to an increase of the output. The opposite end 7 of lever 6 engages in a groove 8 of the sleeve 9 of a centrifugal governor, the whole of which will be hereinafter designated by reference number 10. The shaft 11 of the centrifugal governor 10 is driven by the shaft 2 of the pump. The details of governor 10 are shown by Fig. 2. Lever 6 is further connected at one of its points, through a rod 14, with the operating member (pedal) 13 actuated by the operator. Pedal 13 is urged by a spring 16 toward a stop 15. It can be depressed by the operator, against the action of spring 16, until collar 17 is in contact with a stationary stop 18. Stop 15 determines the position of the pedal that corresponds to idling of the engine, while stop 18 determines the position that corresponds to the maximum output of the pump.

Centrifugal governor 10 includes weights 19 driven by shaft 11. These weights are connected on the one hand through jointed arms 20 with a rotor frame 21 rigidly mounted on shaft 11, and on the other hand through jointed arms 22 with sleeve 9. A longitudinal slot 23 is provided in shaft 11. A transverse pin 24 fixed to sleeve 9 extends through this longitudinal slot and moves therein when sleeve 9 is moving. A spring 25 is disposed in a recess 26 provided in shaft 11 and is compressed between pin 24 and the bottom 27 of this recess. A ring 28 is adapted to slide along portion 29 of shaft 11 and can move between two stops 30 and 31 carried by this shaft. A spring 32 is compressed between ring 28 and part 21. An additional spring 33 is provided about portion 34 of shaft 11 and can be compressed between the end 35 of sleeve 9 and ring 28 when sleeve 9 moves toward the right hand side of the figure.

Figure 3:
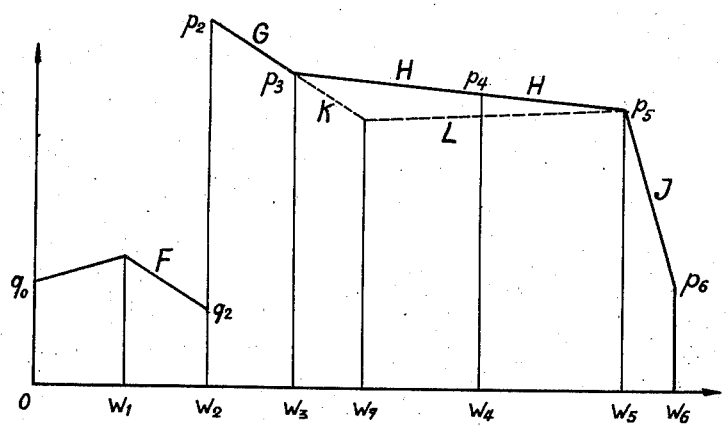
Fig. 3 shows the variations of the output of the pump shown in Fig. 1, as a function of the working speed.

The working of this device is the following:

The engine being stopped, and pedal 13 being applied against stop 15 by spring 16 in the position shown in Fig. 1, the various parts of the governor occupy the position shown in Fig. 2. Spring 25 pushes sleeve 9 toward the left hand side of the drawing, maintaining pin 24 applied against the end 36 of slot 23. The output control member 3 is then in a position that corresponds to an output $q_0$ of the pump per revolution of the engine, this output being relatively important. (See Fig. 3).

If the engine is started on no load, without modifying the position of pedal 13, the relatively important amount of fuel injected per revolution causes the speed of the engine to increase, and the working speed reaches, and then exceeds a value $w_1$, for which the centrifugal effort of the weights 19 becomes equal to the strength of spring 25. These weights then move away from each other, displacing sleeve 9 toward the right hand side of the drawing against the opposing action of spring 25. Sleeve 9 drives, together with itself, the end 7 of lever 6 which pivots about the articulation axis 37 of lever 6 with respect to rod 14 which is then stationary. The end 5 of lever 6 drives the output control member 3 in the direction opposed to arrow 12 and, consequently, produces a decrease of the output as a function of the working speed represented by the portion F of the curve of Fig. 3. The working speed becomes stabilized at a value $w_2$ for which the position of sleeve 9 determined by the equilibrium of the centrifugal force of the weights and of the force of spring 25 corresponds to an output $q_2$ for which the power developed by the engine is equal to the passive resistances to motion of the engine working on no load for this working speed. The strength of spring 25 is chosen in such manner that this working speed $w_2$ of the engine may correspond to a normal idling speed. This is the ordinary working of idling regulation devices.

If the pedal 13 is fully depressed, bringing collar 17 into contact with stop 18, the movements of the pedal are transmitted through rod 14 to lever 6 which pivots about its end 7 engaged in the groove 8 of the sleeve 9 of the governor. The output control member 3 is then moved in the direction of arrow 12 and the output per revolution reaches a very high value $p_2$. The speed of revolution of the engine rapidly increases and, under the effect of the centrifugal force of the weights, sleeve 9 moves toward the right hand side, compressing spring 25 until the edge 35 of said sleeve 9 comes into contact with spring 33, which takes place when the speed of revolution of the engine reaches a value $w_3$ which is not very different from the speed of revolution corresponding to idling running. Sleeve 9 drives, together with itself, lever 6 which pivots about articulation 37 and produces a decrease of the output from value $p_2$ to value $p_3$. The variation of output is represented by portion G of the curve. Sleeve 9 has then moved a distance $a$ from the position of rest.

From this time on, if the working speed keeps increasing, the effort of spring 33 is added to the effort exerted by spring 25 for opposing the movement away from each other under the effect of the centrifugal force. Spring 33 is so devised that its strength increases rapidly for a relatively small compression thereof. Sleeve 9 therefore moves slowly toward the right hand side when the working speed increases from value $w_3$ and, simultaneously, the output control member 3 moves slowly toward the left hand side, that is to say in the direction of decreasing outputs. If the load of the engine is sufficient, the speed of the engine gets stabilized at a value $w_4$. For this speed, the output has a value $p_4$ and the torque of the engine balances this load. If the load of the engine is insufficient, the speed increases up to a value $w_5$ which it must not exceed, the output having a value $p_5$.

While the working speed varied from value $w_3$ to value $w_5$, that is to say varied through the whole range of the speeds corresponding to normal running, sleeve 9 was only given a relatively small displacement $c$ and the corresponding displacement of the output control member 3 is only a small portion of the total stroke of this member, for instance 10% or 20% of this stroke. The variation of the output between speeds $w_3$ and $w_5$ is represented by the portion of curve H.

The initial tension of spring 32, when ring 28 is in contact with stop 30, is determined in such manner that this tension, when added to the tension of spring 25 (which is relatively small) balances the centrifugal effort of the masses when the engine reaches the speed $w_5$ which it should not exceed.

If, due to the insufficiency of the load, the working speed exceeds value $w_5$, sleeve 9 further moves toward the right hand side under the action of the centrifugal effort of the weights of the governor, compressing spring 32 through the intermediary of spring 33, with which it is disposed in series. Spring 32 is so devised that its strength increases slowly for a relatively large compression thereof, so that sleeve 9 moves rapidly a relatively great distance $d$ when the working speed increases up to a value $w_6$ which is but little higher than speed $w_5$. At the same time, the output control member 3 moves rapidly in the direction of decreasing outputs, and the output drops down to a value $p_6$ which is very low. The power developed by the engine drops rapidly and consequently the working speed ceases to increase. This is the usual working of speed limiting regulators. The variation of the output between working speeds $w_5$ and $w_6$ is represented by the portion of curve J.

When the working speed reaches value $w_6$, ring 28 moves toward stop 31 corresponding to an output equal to zero, and reaches it after having moved a distance $b$ which is slightly smaller than distance $d$, since spring 33 has been slightly compressed when the working speed has varied from value $w_5$ to value $w_6$.

If, according to usual arrangements, spring 33 did not exist, the portion 34 of shaft 11 being then shortened by a distance equal to the length of spring 33, which corresponds to the maximum working speed $w_5$, the variation of output between working speeds $w_3$ and $w_5$ would be represented by the portions of curve K and L shown in dotted lines. When the working speed increases progressively from value $w_3$, the sleeve would first move toward the right hand side under the effect of the centrifugal force of the weights, compressing only spring 25, and the output would decrease according to the portion of curve K. For a value $w_7$ of the working speed, which is little different from $w_3$, the end 35 of sleeve 9 would come into contact with ring 28 after having moved a distance $c$. From this time on, sleeve 9 would occupy a stationary position in contact with ring 28 until the working speed would have reached value $w_5$ since, up to this value of the working speed, the centrifugal effort of the masses is lower than the initial tension of spring 32. The output control member 3 would also occupy a stationary position, and the output, represented by curve L, would slowly increase with the working speed, since the leakage of the pump decreases gradually when the working speed increases.

It is clear that curve L is located under curve H. The device according to the present invention permits of increasing the maximum amount of fuel that the pump can feed to the engine at low speeds of revolution and therefore to increase the power of the engine at these low speeds. If, by choosing a spring 33 having a suitable law of compression, this increase in fuel output at low speeds is made larger than the leakage of the pump at said speeds, the actual maximum output per revolution becomes higher at low speeds than at high speeds, while, in ordinary pumps, the maximum output is lower at low speeds, due to the leakage of the pump.

Figure 4:
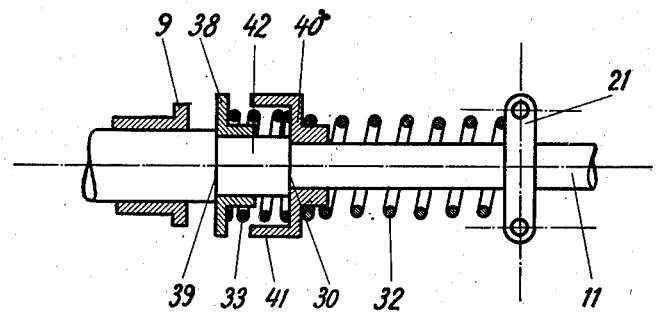
Fig. 4 shows a modification of a detail of the governor shown in Fig. 2.

In Fig. 4, the additional spring 33 is initially compressed in the state of rest between a ring 40 and an annular disc 38 butting against a shoulder 39 of shaft 11. Disc 38 is capable of sliding along portion 42 of shaft 11. The initial tension of spring 32, which is higher than the initial tension of spring 33, normally maintains ring 40 applied against shoulder 30. Ring 40 carries a cylindrical extension 41 which surrounds spring 33 and limits the displacements of annular element 38 toward the right hand side.

When the working speed gradually increases from the value corresponding to idling running, sleeve 9 first comes into contact with annular element 38 for a given working speed. The speed further increasing, the position of sleeve 9 does not vary until the working speed has reached a value for which the centrifugal effort of the masses exceeds the initial tension of spring 33. Sleeve 9 then pushes annular element 38, compressing spring 33 and said sleeve moves slowly toward the right hand side, while the working speed increases. At the same time the output control member 3 moves slowly toward the left hand side. This movement ceases when the working speed reaches a determined value, for which annular element 38 comes to butt against the cylindrical extension 41 of ring 40. When the working speed further increases beyond this value, sleeve 9 occupies a stationary position until the working speed reaches its normal maximum value. Beyond this speed the centrifugal effort of the weights of the governor is sufficient for causing sleeve 9 to push back ring 40 through the medium of annular element 38, compressing spring 32. Sleeve 9 then moves rapidly toward the right hand side and rapidly reduces the output of the pump down to a very low value.

It will be seen that with the arrangement shown in Fig. 4, the limit position of the output control member 3 in the direction of increasing outputs is variable only for a portion of the range of normal working speeds, while with the arrangement shown in Fig. 2 it is variable for the whole of this range of speeds.

Annular element 38 could be done away with and the action of spring 33 would then be limited only in the direction of increasing working speeds by the contact of sleeve 9 with the cylindrical portion 41 of ring 40.

On the other hand, the cylindrical portion 41 of ring 40 could be dispensed with. The action of spring 33 would then be limited only to low working speeds by the initial tension of this spring.

Figure 5:
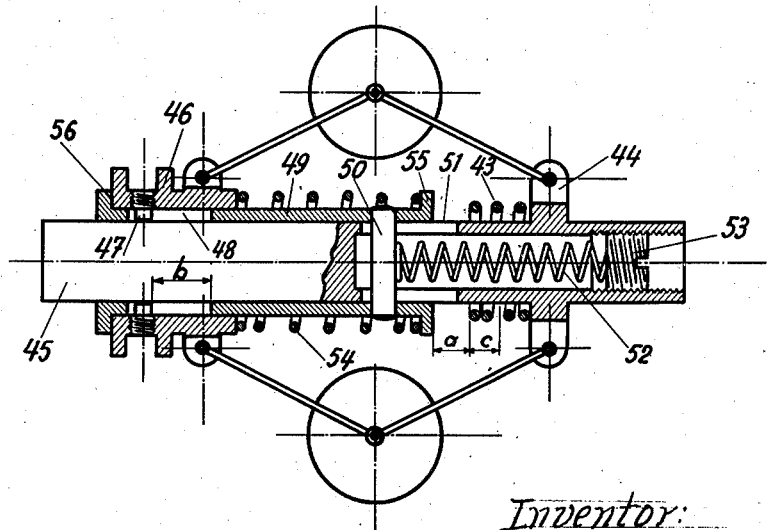
Fig. 5 shows, in longitudinal section, another embodiment of the governor of Fig. 2.

The order in which the spring that controls the maximum speed of revolution and the additional spring are disposed is obviously without importance. The additional spring, instead of being placed before the spring that determines the maximum speed of revolution, as shown in Fig. 2, can, on the contrary, be disposed after this spring. This arrangement has been shown in Fig. 5. In this figure, the jointed arms of the governor are connected on the one hand with a part 44 integral with the shaft 45 of the governor and on the other hand with sleeve 46 which slides along intermediate sleeve 49, itself slidably mounted on shaft 45. The end of lever 6 engages in a groove of sleeve 46. Two lugs or studs 47, engaged in slots 48 of the intermediate sleeve 49, prevent sleeve 46 from rotating with respect to intermediate sleeve 49. A pin 50, extending through two slots 51 provided in shaft 45, which is hollow in this part thereof, prevent intermediate sleeve 49 from rotating with respect to shaft 45. Spring 52, which determines the idling speed is compressed between this pin 50 and a threaded plug 53 screwed in the end of shaft 45. Spring 54, which determines the maximum speed of revolution, is compressed between sleeve 46 and a shoulder 55 of the intermediate sleeve 49. The pressure of spring 54 applies sleeve 46 against a shoulder 56 of the intermediate sleeve 49. The additional spring 43, which produces the variation, as a function of the working speed, of the limit position of the output control member 3 in the direction of increasing outputs while under normal conditions of working, is disposed between shoulder 55 and part 44. In the state of rest there is a certain play between shoulder 55 and spring 43.

When the working speed of the engine gradually increases, starting from the state of rest, the whole of sleeve 46 and intermediate sleeve 49 first moves as a single unit, compressing spring 52 which determines the idling speed. After having moved a distance $a$, which corresponds to idling running, shoulder 55 comes into contact with the end of spring 43 and compresses this spring, the corresponding displacement being $c$, while the working speed rises up to its normal maximum value. For the whole of this period, sleeve 46 remains applied against shoulder 56 because the initial tension of spring 54 balances the centrifugal effort of the weights of the governor which corresponds to the maximum normal working speed of the engine, so that this spring cannot be compressed before this working speed has been reached. When this speed is exceeded, sleeve 46 leaves shoulder 50 and compresses spring 54, which is so devised that its strength increases slowly for a relatively large compression thereof, whereby a small increase of the speed (and consequently of the centrifugal force) causes sleeve 46 to move a relatively large distance $b$.

Figure 6:
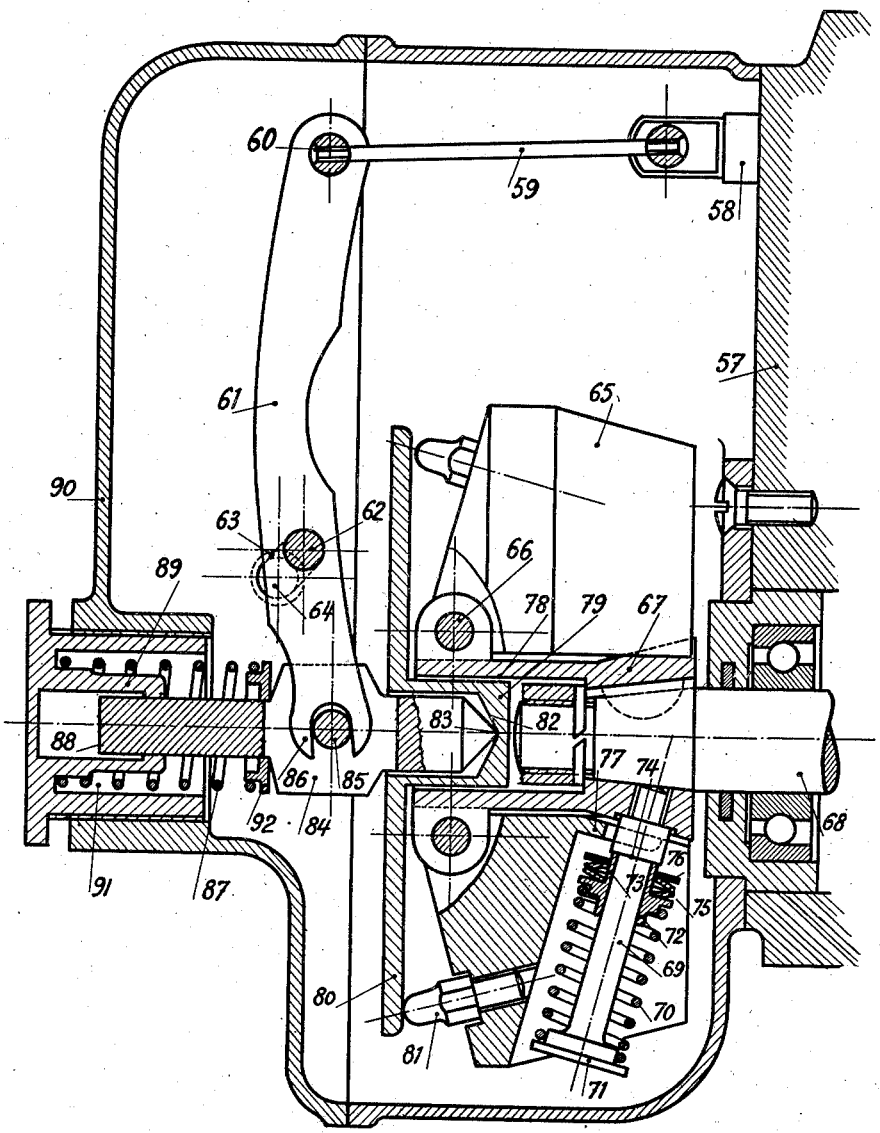
Fig. 6 shows, in longitudinal section, a practical embodiment of the invention.

In the embodiment illustrated by Fig. 6, the output of pump 57 is controlled by means of output control member 58 (consisting of a rack in this case). The end of rack 58 is connected through a rod 59 with one of the ends 60 of lever 61. Lever 61 is pivoted at 62 to a crank pin 63 mounted on a shaft 64. The throttle pedal controls the rotation of this axis 64 and of crank pin 63 by means of a transmission which has not been shown on the drawings.

The governor includes a system of weights 65, pivoted about axes 66 to a rotor frame 67 provided at the end of the pump shaft 68. Rotor frame 67 carries small columns 69. Each weight 65 is provided with a recess in which is housed the corresponding small column 69. On each column 69 there is mounted a spring 70 compressed between the head 71 of the column and a ring 72 sliding thereon. Spring 70 serves to apply the end of the cylindrical portion 73, which forms an extension of ring 72, against a shoulder 74 carried by said column. On the cylindrical part 73 of ring 72 there is disposed a system of one or several elastic washers 75 (Belleville washers) located adjacent to a rigid ring 76, which serves merely to transmit the pressure of the weights of the governor to elastic elements 75. Each weight 65 is provided with a fork 77. When the weights are moved away by the action of the centrifugal force, fork 77 comes into contact with rigid ring 76 and then compresses, through it, first the elastic elements 75 and then spring 70. In the state of rest there exists a certain play between fork 77 and rigid ring 76.

In the cylindrical bore 78 which is provided at the end of rotor frame 67, the pivot 79 of a plate 80 is capable of rotating freely. Each weight 65 carries a projection 81 which is applied against plate 80. The weights of the governor, when they are moved away from one another push this plate toward the left hand side. This pivot 79 of the plate is hollow and has a conical bottom 82. A cone 83 forming the extremity of a member 84 which carries a lug 85 is applied against this conical bottom. Lug 85 is engaged in a fork 86 forming the extremity of lever 61. Member 84 is terminated by a cylindrical portion 88 which is slidably mounted inside a plug 89 screwed in the casing 90 of the governor. Plug 89 is provided with a groove 91 in which is mounted a spring 87 compressed between the bottom of this groove and a ring 92 carried by member 84. The displacements of weights 65 are transmitted to member 84 through plate 80 against the center of which the apex of cone 83 is applied. Member 84 in turn displaces the output control member 58 through lug 85, lever 61 and connecting rod 59.

Spring 87 controls the idling speed. Spring 70 controls the maximum speed of revolution; and the system of elastic elements 75 constitutes the additional spring.

When the speed of revolution of the engine gradually increases, starting from the state of rest, masses 65, moving away from each other under the effect of the centrifugal force, first compress spring 87 through projections 81, plate 80 and member 84. Each fork 77 then comes into contact with the corresponding rigid ring 76 and the centrifugal force of the mass compresses elastic member 75 (normal running). When the normal maximum speed is exceeded, each mass compresses the corresponding spring 70, through rigid ring 76, elastic members 75, and ring 72 which ceases to be in contact with stop 74. The outward movement of the masses is transmitted to member 84 and to the output control member 58 and, finally, the governor described in Fig. 6 controls the position of the output control member 58 exactly in the same manner as the governor shown in Fig. 2.

While I have in the above description described what I deem to be practical and efficient embodiments of the present invention it should be well understood that I do not wish to be limited thereto as there might be changes made in the arrangement, disposition, and form of the parts without departing from the principle of the present invention as comprehended within the scope of the appended claims.

In the appended claims, the term "sleeve" is used generically, and it refers to the governor member movable responsive to the centrifugal elongation of the weights, without any limitation to any particular shape.

What I claim is:

1. A centrifugal governor for adjusting the connection between a control member and the fuel output regulating member of an injection pump for an internal combustion engine, which comprises, in combination, a rotary shaft for connection with a shaft driven by the engine; a plurality of rotary units rotated by said rotary shaft; each of said rotary units including a radially extending mounting member having a spring seat member, a centrifugal weight having a spring seat member, mounted for longitudinal movement of its spring seat member with respect to the mounting member, a sliding member loosely mounted on said mounting member between said spring seat members, a stop on said mounting member for said sliding member, a first compression spring interposed between the spring seat member of the mounting member and said sliding member and urging said sliding member towards said stop, a second compression spring interposed between the spring seat member of the weight and said sliding member, said stop imposing to said first spring through said sliding member an initial compression which is overcome only in the maximum speed range by the centrifugal effort of said weight transmitted to said first spring by said second spring and said sliding member; a sleeve for connection with said output regulating member, operative by said weights; said second springs being so devised that the motion imparted by said sleeve to said fuel output regulating member, for a variation of speed through the normal speed range between idling speed range and maximum speed range, is only a small portion of the whole stroke of said output regulating member, and said first springs being so devised that the motion imparted by said sleeve to said fuel output regulating member, for a variation of speed through the maximum speed range, covers substantially the whole stroke of said output regulating member.

2. A centrifugal governor according to claim 1 in which said second springs consist of elastic washers collapsible in their axial direction.

3. A centrifugal governor for adjusting the connection between a control member and the fuel output regulating member of an injection pump for an internal combustion engine, which comprises, in combination, a rotary shaft for connection with a shaft driven by the engine; a plurality of rotary units rotated by said rotary shaft; a centrifugal weight in each rotary unit; a sleeve for connection with said output regulating member, operative by said weights; a light spring operative within the idling speed range for loading said sleeve; each of said rotary units further including a radially extending mounting member having a spring seat member, a spring seat member on said weight, said weight being mounted for longitudinal movement of its spring seat member with respect to the mounting member, a sliding member loosely mounted on said mounting member between said spring seat members, a stop on said mounting member for said sliding member, a first strong compression spring interposed between the spring seat member of the mounting member and said sliding member and urging said sliding member towards said stop, a second strong compression spring interposed between the spring seat member of the weight and said sliding member, said weight being adapted to contact by its spring seat member with said second strong spring after a predetermined compression by the sleeve of said light spring, which corresponds to idling speed range, said stop imposing to said first strong spring through said sliding member an initial compression which is overcome only in the maximum speed range by the centrifugal effort of said weight transmitted to said first strong spring by said second strong spring and said sliding member; said second strong springs being so devised that the motion imparted by said sleeve to said fuel output regulating member, for a variation of speed through the normal speed range between idling speed range and maximum speed range, is only a small portion of the whole stroke of said output regulating member, and said first strong springs being so devised that the motion imparted by said sleeve to said fuel output regulating member, for a variation of speed through the maximum speed range, covers substantially the whole stroke of said output regulating member.

4. A centrifugal governor according to claim 3 in which said second strong springs consist of elastic washers collapsible in their axial direction.

5. A centrifugal governor, which comprises, in combination, a rotary shaft; a plurality of rotary units rotated by said rotary shaft; each of said rotary units including a radially extending mounting member having a spring seat member, a centrifugal weight having a spring seat member, mounted for longitudinal movement of its spring seat member with respect to the mounting member, a sliding member loosely mounted on said mounting member between said spring seat members, a stop on said mounting member for said sliding member, a first compression spring interposed between the spring seat member of the mounting member and said sliding member and urging said sliding member towards said stop, a second compression spring interposed between the spring seat member of the weight and said sliding member, said stop imposing to said first spring through said sliding member a predetermined initial compression; a sleeve operative by said weights; said second springs being so devised that said weights impart to said sleeve a relatively small motion for a variation of speed through a large range of speeds, and said first springs being so devised that said weights impart to said sleeve a relatively large motion for a variation of speed through a narrow range of speeds above said first mentioned range of speeds.

6. A centrifugal governor according to claim 5 in which said second springs consist of elastic washers collapsible in their axial direction.

7. A centrifugal governor, which comprises, in combination, a rotary shaft; a plurality of rotary units rotated by said rotary shaft; a centrifugal weight in each rotary unit; a sleeve operative by said weights; a light spring operative below a predetermined speed for loading said sleeve; each of said rotary units further including a radially extending mounting member having a spring seat member, a spring seat member on said weight, said weight being mounted for longitudinal movement of its spring seat member with respect to the mounting member, a sliding member loosely mounted on said mounting member between said spring seat members, a stop on said mounting member for said sliding member, a first strong compression spring interposed between the spring seat member of the mounting member and said sliding member and urging said sliding member towards said stop, a second strong compression spring interposed between the spring seat member of the weight and said sliding member, said weight being adapted to contact by its spring seat member with said second strong spring after a predetermined compression by the sleeve of said light spring, which corresponds to said predetermined speed, said stop imposing to said first strong spring through said sliding member a predetermined initial compression; said second strong springs being so devised that said weights impart to said sleeve a relatively small motion for a variation of speed through a large range of speeds above said predetermined speed, and said first strong springs being so devised that said weights impart to said sleeve a relatively large motion for a variation of speed through a narrow range of speeds above said first mentioned range of speeds.

8. A centrifugal governor according to claim 7 in which said second strong springs consist of elastic washers collapsible in their axial direction.

9. A device for controlling a fuel injection pump for an internal combustion engine, which comprises, in combination a fuel output regulating member in said pump, a driver operated control member, an operative connection between said control member and said fuel output regulating member, stop means for limiting the movement of said control member in the direction of increasing the output of said pump, a rotary shaft for connection with a shaft driven by the engine, centrifugal weights rotated by said rotary shaft, a sleeve operative by said weights, means operative by said sleeve for altering said operative connection between the control member and the output regulating member, adapted to move the position of said output regulating member corresponding to a predetermined position of said control member in the direction of decreasing output as said weights move away from said rotary shaft, first and second spring means mounted in series for loading said weights, stop means for imposing to said first spring means a predetermined initial compression, said second spring means being so designed that said weights impart to said sleeve a relatively small motion for a variation of speed through a large range of speeds, said first spring means being so designed that said weights impart to said sleeve a relatively large motion for a variation of speed through a narrow range of speeds above said first mentioned range of speeds.

10. A device for controlling a fuel injection pump for an internal combustion engine, which comprises, in combination, a fuel output regulating member in said pump, a driver operated control member, an operative connection between said control member and said fuel output regulating member, stop means for limiting the movement of said control member in the direction of increasing the output of said pump, stop means for limiting the movement of said control member in the direction of decreasing the output of said pump, a rotary shaft for connection with a shaft driven by the engine, centrifugal weights rotated by said rotary shaft, a sleeve operative by said weights, means operative by said sleeve for altering said operative connection between the control member and the output regulating member, adapted to move the position of said output regulating member corresponding to a predetermined position of said control member in the direction of decreasing output as said weights move away from said rotary shaft, first and second spring means mounted in series for loading said weights above a predetermined speed and inoperative below said predetermined speed, third spring means operative below said predetermined speed for loading said weights, stop means for imposing to said first spring means a predetermined initial compression, said second spring means being so devised that said weights impart to said sleeve a relatively small motion for a variation of speed through a large range of speeds above said predetermined low speed, said first spring means being so devised that said weights impart to said sleeve a relatively large motion for a variation of speed through a narrow range of speeds above said first mentioned range of speeds.

JOHANN LICHTENSTEIN.